Figure 1:
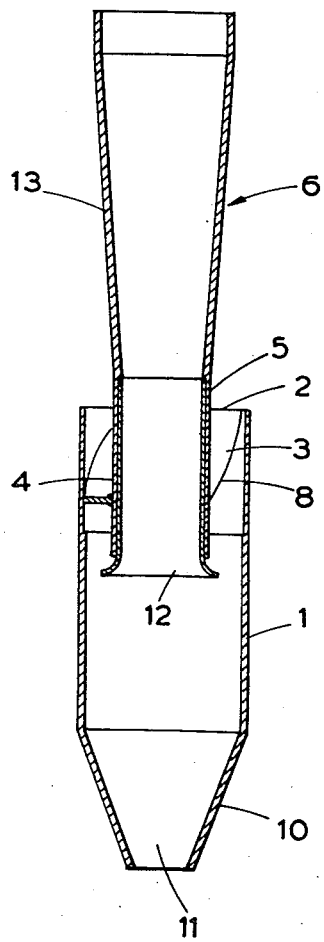

Feb. 16, 1965    C. M. STREETE ETAL    3,169,842
CYCLONES FOR REMOVING SOLIDS FROM GAS
Filed April 16, 1962

INVENTORS:
CHARLES MATHIAS STREETE
STANLEY PAUL WITCHELL
BY
Silverman, Mullin & Cass
ATTORNEYS

3,169,842
CYCLONES FOR REMOVING SOLIDS FROM GAS
Charles M. Streete, Abergavenny, and Stanley Paul Witchell, Llanfoist, Abergavenny, England, assignors to Coopers Mechanical Joints Limited, Llanfoist Works, Abergavenny, Monmouthshire, England
Filed Apr. 16, 1962, Ser. No. 187,525
5 Claims. (Cl. 55—449)

This invention relates to cyclones for separating solids from gas. Such a cyclone, which is usually symmetrical about a vertical axis, includes a vessel in which a stream of gas is caused to whirl so that the solids, owing to their weight, are caused by centrifugal force to reach the wall of the vessel where their velocity is reduced by friction. The solids, therefore, fall to the bottom of the vessel while the cleaned gas is discharged through a coaxial outlet tube leading out of the top of the vessel. The bottom of the vessel is usually of a frusto-conical shape with an axial outlet opening for the impurities. It is well known that the separation of impurities is more effective in small cyclones than in large and it has, accordingly, proved highly practical to use clusters of cyclones to clean the intake air for automotive engines. Such clusters may also be used for the air intakes of gas turbines, and also used in air conditioning plants.

One object of the present invention is to increase the air handling capacity of a cyclone of a given size, without loss of efficiency, thus enabling a more compact cluster to be used than would otherwise be possible. While the invention is primarily concerned with gas cleaning units consisting of clusters or groups of cyclones, it also includes gas cleaning units constituted by single cyclones.

According to the invention a cyclone for separating solids from gas includes a cylindrical vessel, an outlet tube mounted axially in the vessel and at least one fixed blade mounted in the vessel so that the laden gas encounters the leading edge of the blade at a zero or small angle of incidence, the blade being curved so as to impart to the gas, as it travels along the blade to its trailing edge, an increasing component of velocity that is tangentially directed with respect to the vessel whereby the combined effect of the blade and vessel is to impart a whirling motion to the gas prior to entering the outlet tube.

The vessel and outlet tube preferably are both of circular cross-section and advantageously there may be three blades as aforesaid equidistantly distributed around the annular space between the vessel and outlet tube, the three blades all being in the same axial zone of the cyclone. Owing to the fact that the initial axially moving gas stream gradually has the whirling movement imparted thereto, by the curved blades, without any sudden diversion, it is believed that a saving of 10% to 15% of the energy used in causing the gas to rotate is saved relatively to prior arrangements in which flat blades are used.

According to a further feature of the invention, the outlet tube is made in the form of a venturi. Thus, the outlet tube may have an untapered section at the zone containing the blade or each blade, an outwardly flared section leading into the untapered section, and an outwardly tapered section leading out of the untapered section. The flared inlet end may be constituted by a lip which curves outwards to its outer periphery, which may lie on a radius that is approximately half way between the radius of the untapered section of the tube and the radius of the adjacent portion of the vessel. The tapered section of the venturi is preferably not less than twice the length of the untapered section of the outlet tube. The taper is preferably such that the angle included by the taper is seven and a half to eight degrees of arc. The venturi shaped outlet tube reduces the losses that arise as the gas vortices are transferred to the tube and discharge, for example to the inlet of an internal combustion engine, or to the atmosphere. When the venturi outlet tube is used in conjunction with the aforesaid curved blades, the overall saving of energy, as compared with a convention cyclone of about the same size with flat blades and a simple cylindrical outlet tube, is about 35% in terms of increased throughput without loss of efficiency. This effect is due to the reduction of internal resistance in the cyclone so that more of the available energy is used for separating the dust from the gas.

Figure 2:
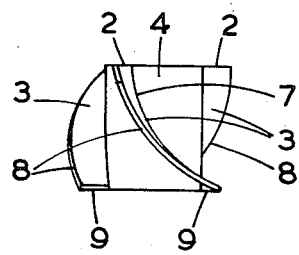
Figure 3:
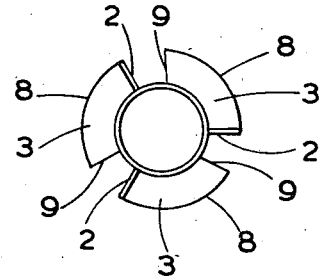

In order that the invention may be clearly understood, one construction in accordance therewith will now be described, by way of example, with reference to the accompanying drawings, in which:

FIGURE 1 is a sectional elevation of a cyclone; and
FIGURES 2 and 3 are respectively a side elevation and a plan of a portion of the cyclone of FIGURE 1.

In this example, dirty air to be cleaned enters the upper end of a cyclone vessel 1 in a substantially axial direction. The air immediately encounters the leading edges 2 of three blades 3 fixed to a sleeve 4 surrounding an untapered portion 5 of a venturi-shaped outlet tube 6. The width of each blade 3 is such that it extends outwards to the wall of the vessel 1, and the inner and outer edges 7, 8 of each blade follow helical lines on the inner surface of the vessel 1 and the outer surface of the sleeve 4, the blade being soldered to the sleeve 4 along the inner helical line. The pitches of these helical lines are not constant from the leading edge 2 to the trailing edge 9 of each blade, because the blade is curved along its chord so as to impart a smoothly increasing quantum of tangential velocity to the incoming air stream. Thus, the leading portion of each blade is quite steep and the blade gradually becmoes less and less steep towards the trailing edge 9. In this example, which has been found suitable for the sort of air velocities encountered in the air intakes of automotive engines, the angle of incidence of the leading edge of the blade with respect to the axially flowing, incoming air is ten degrees of arc. The angle at which the stream leaves the blade is about twenty-three degrees of arc to the horizontal. The well-known "Coanda effect" assists the smooth flow of air over the convex side of the blade.

From FIGURE 3 it will be seen that, in plan, each blade extends over an arc of ninety degrees between the vessel 1 and outlet tube 6.

The vessel has the usual conical bottom 10 with an outlet 11 through which the separated dust is discharged. The outlet tube 6 has a flared inlet 12 and an expanding tapered outlet 13.

The drawings are to scale and the size of the cyclone can be estimated from the fact that the inside diameter of the vessel 1 is one and three-sixteenths inches. It was found that when tested with dust according to B.S. 1701, an efficiency of 96% to 97.5% was obtained at a pressure loss of only two and a half to nine and a half inches water gauge with volumetric flows of from 6.2 cubic feet per minute to 18 cubic feet per minute.

If desired, the cyclone may be wholly or partly moulded from a synthetic plastic material, such as nylon, polythene, or polypropylene profax.

When a number of cyclones are mounted as a cluster or group, the vessel 1 extends downwards from a common inlet manifold through which the outlet tubes 6 project upwards into a common outlet manifold that can be connected to the air inlet of an internal combustion engine. The outlet manifold may contain a further filter such, for example, as a paper filter. The collected dust is discharged from the vessels into a common container. It is also not impracticable to mount the cluster of cyclones with their axes horizontal.

We claim:

1. A cyclone for separating solids from air being drawn to the inlet of an internal combustion engine, the cyclone comprisng, in combination, a vessel for receiving the separate solids, said vessel having an untapered cylindrical portion, an outlet venturi tube mounted concentrically with respect to said untapered cylindrical portion, said outlet venturi tube having an untapered cylindrical section telescopically disposed within said untapered cylindrical portion, said venturi tube having an outwardly tapered section leading out of said untapered cylindrical section, the length of said tapered section being no less than twice the length of said untapered section with the angle of taper being approximately seven and one half degrees of arc, a flared inlet section telescopically disposed within the entrance to said untapered section and said inlet section having an entrance lip curving inward from its outer periphery to that portion disposed within said untapered section, said flared section having a radius at the periphery of said entrance lip approximately equal to one-half the sum of the radii of said cylindrical portion of said vessel and said cylindrical untapered section of said venturi tube, a plurality of blades distributed about the untapered section of said venutri tube and having the pitch thereof selected whereby air passing between said venturi tube and said vessel encounters each blade at a substantially zero angle of incidence, with the pitch being increased to a maximum near said entrance lip to impart to the passing air an increasing component of velocity which is tangentially directed with respect to said vessel, whereby to impart a whirling motion to the air prior to same entering the said venturi tube with solids being substantially entirely separated and discharged within said vessel.

2. A cyclone as claimed in claim 1 in which said blades bridge the gap between said untapered cylindrical portion of the vessel and the untapered cylindrical section of the venturi tube.

3. A cyclone for separating solids from air being drawn to the inlet of an internal combustion engine, the cyclone including, in combination, a vessel into which the solids are deposited and having an untapered cylindrical portion, an outlet venturi tube mounted concentrically with respect to said cylindrical portion and having an untapered cylindrical section within said cylindrical portion of said vessel, an outwardly tapered section leading out of said untapered section for delivering clean air to said inlet and of a length not less than twice the length of said untapered section, the angle included by the taper being approximately seven and a half degrees of arc, and a flared inlet section leading into said untapered section and consisting of a lip which curves inwards from its outer periphery to said untapered section, said periphery having a radius which is approximately half the sum of the radii of said cylindrical portion and said cylindrical section, and a plurality of blades distributed about said untapered section of said venturi tube and each shaped so that air axially entering the space between said untapered section and said untapered portion of said vessel encounters the leading edge of the blade at substantially zero angle of incidence, each blade being curved so as to impart to the air as it travels along the blade to its trailing edge, an increasing component of velocity that is tangentially directed with respect to said vessel whereby the combined effect of the blade and vessel is to impart a whirling motion to the air prior to entering said venturi tube, separated solids being discharged into said vessel.

4. A cyclone according to claim 3, in which there are only three blades, said blades being shaped so that, as viewed in plan, the leading edge of each blade does not overlap the trailing edge of an adjacent blade and so that as viewed in elevation, the length of each blade measured along its curved outer edge from its leading edge to its trailing edge is at least four times the radial gap between said cylindrical portion and said cylindrical section.

5. A cyclone for separating solids being drawn to the inlet of an internal combustion engine, the cyclone including, in combination, a vessel into which the solids are deposited and having an untapered cylindrical portion, an outlet venturi tube mounted concentrically with respect to said cylindrical portion and having an untapered cylindrical section within said cylindrical portion of said vessel, an outwardly tapered section leading out of said untapered section for delivering clean air to said inlet, and a flared inlet leading into said untapered section, and only three blades distributed about said untapered section of said venturi tube and each extending between said untapered section and said untapered portion along the whole length of said blade, and said blades being shaped so that, as viewed in plan, the leading edge of each blade does not overlap the trailing edge of an adjacent blade, and so that, as viewed in elevation the length of each blade measured along its curved outer edge from its leading edge to its trailing edge is at least four times the radial gap between said cylindrical portion and said cylindrical section.

References Cited by the Examiner

UNITED STATES PATENTS

| 385,263 | 6/88 | Hardenbergh | 55—457 |
| 416,455 | 12/89 | Gaunt | 55—457 |
| 548,490 | 10/95 | Weck et al. | 55—457 X |
| 684,829 | 10/01 | Labadie. | |
| 1,573,135 | 2/26 | Bourne et al. | 55—457 X |
| 1,576,670 | 3/26 | McGee. | |
| 2,229,824 | 1/41 | Shaw | 55—449 X |
| 2,346,005 | 4/44 | Bryson | 55—457 X |
| 2,551,890 | 5/51 | Love | 55—339 X |

FOREIGN PATENTS

| 17,013 | 1928 | Australia. |
| 493,152 | 1/50 | Belgium. |
| 517,537 | 2/53 | Belgium. |

GEORGE D. MITCHELL, *Primary Examiner.*

REUBEN FRIEDMAN, *Examiner.*